Aug. 13, 1957 E. C. GRIESBACH 2,802,774
METHOD OF ALCOHOL PRODUCTION
Filed April 2, 1951
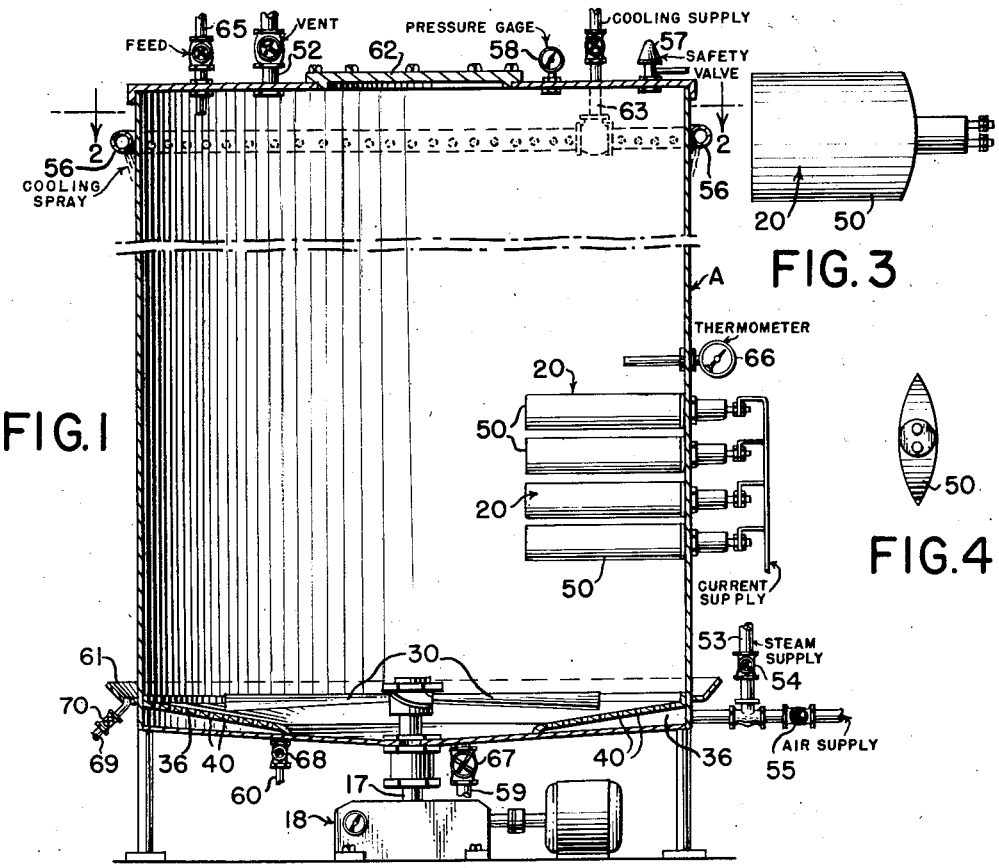
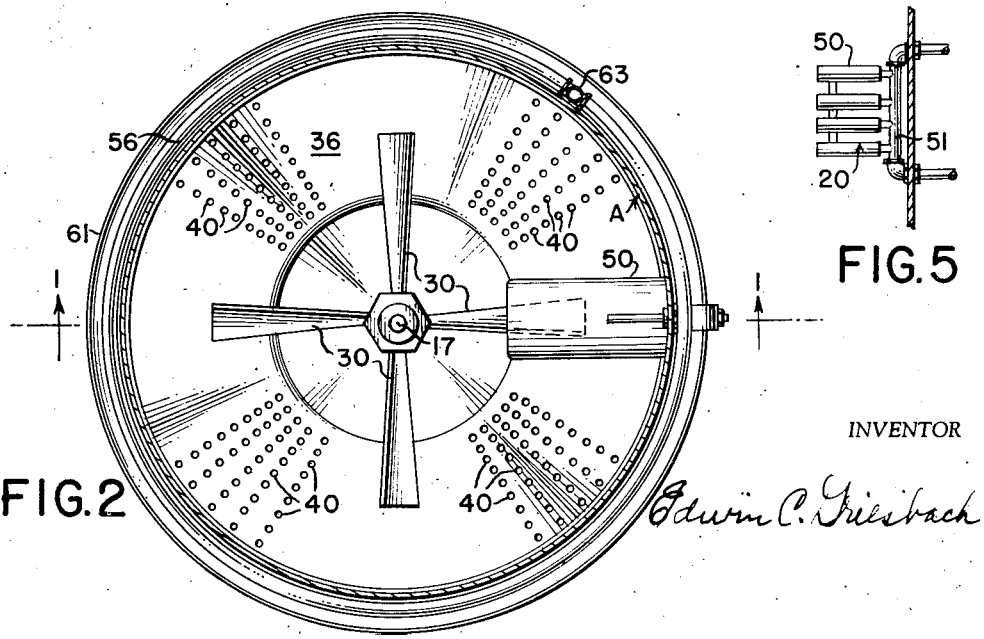
INVENTOR
Edwin C. Griesbach

United States Patent Office 2,802,774
Patented Aug. 13, 1957

2,802,774

METHOD OF ALCOHOL PRODUCTION

Edwin C. Griesbach, Oak Park, Ill.

Application April 2, 1951, Serial No. 218,902

2 Claims. (Cl. 195—15)

My invention relates to an improved method of yeast fermentation for the production of alcohol.

This application is a continuation-in-part of my copending applications Serial No. 727,307, filed February 8, 1947, for Manufacture of Yeast and Alcohol, now abandoned, and Serial No. 96,811, filed June 2, 1949, now abandoned, for Method of Alcohol Production.

An important object and accomplishment of the invention hereinafter described is the provision of a method of increasing alcohol production by applying temperatures to a mixture of yeast-seeded-fermentable material which have heretofore been considered unfavorable.

A further object of the invention is the provision of a method of alcohol production wherein there is eliminated the usual step of complete diastatic conversion of a fermentable medium before introduction of the seed yeast.

Additional objects, features and advantages of the invention disclosed herein will be apparent to persons skilled in the art after the method and the operation thereof are understood from the within description.

The invention accordingly comprises the several steps and the order and relation of one or more of such steps with respect to each of the others thereof, which will be exemplified in the method hereinafter disclosed, and the scope of the application of which will be indicated in the claims.

The general practice in the art has been to maintain the yeast-seeded-fermentable medium throughout at temperatures of about 70° F.–90° F. at which temperatures most species of distiller's yeast are favorably influenced during an alcoholic-yeast fermentation process and in the present process the yeast-containing batch is maintained for the most part within such temperature limits, the temperature within these limits being referred to hereinafter as the favorable or yeast-optimum temperature.

It has been the aim of those practicing the art to control the fermenter content temperature during a process of alcoholic-yeast fermentation in a gentle and uniform manner, as by the control of the temperature of added dilution of nutrition if an addition process is used, by the installation of large serpentine coils in the fermenter to gradually heat or cool the wort, or by surrounding the fermenter with hot or cold water.

I have observed that the yeast is not injured by intermittently and/or periodically subjecting the yeast-seeded-fermentable medium to a relatively high temperature in a little by little manner while sufficiently dissipating the excess accumulative heat substantially throughout the larger portion of the fermenting medium so as to maintain it at a yeast-fermenting temperature. By subjecting the yeast-seeded fermentable medium in the manner above described, to a temperature range of 111° F.–164° F. for short periods of time increased alcohol production is possible. In fact, my investigations have proved that it is even possible to momentarily subject the yeast to temperatures above 164° F. which is authoritatively recognized as the thermal death point of yeast, without injury to the yeast and thereby obtain increased alcohol production.

Thus the yeast-seeded-fermentable medium, while maintained substantially throughout at the above referred-to yeast-optimum temperatures, is subjected in a piece-meal manner, or little by little, to a relatively intense heat of the relatively small heat-exchange means which imparts a transient high heat to the portions of the batch being exposed and produces localized transient or abrupt temperature changes in the exposed portion which however is of insufficient volume to substantially affect the over-all temperature of the batch.

The maximum degree of temperature to which the heated portions of yeast-seeded-fermentable medium are subjected may be varied within wide limits depending upon the particular process used for alcohol production. For example, the alcoholic-yeast-fermentable medium can be composed of many different materials such as cereals, sugar together with inorganic compounds or a combination of these materials. With favorable equipment and like materials alcohol production gains have been accomplished with only the change of heat application procedure in accordance with the present invention. There need be no attempt to use a mean fermenter content temperature above the yeast-optimum degree, as in the present invention the application of heat is localized by the dissipation of an excess substantially-overall-accumulative heat with any suitable coolant means such as hereinbefore described. The invention may also be readily, effectively and economically practiced in an auxiliary phase of fermentation, as being used before the main production fermentation.

It is quite obvious that the equipment and exact method used to attain the desirable results of the invention can vary greatly, such as; size and proportion of vats, the temperature of aeration, if used, and its proximity to the heat-exchange means; duration of exposure of the yeast-seeded-fermentable solution to the relatively high temperature; whether the heat-exchange means is in motion or the fermentable solution circulated against a stationary heat-exchange means; size and temperature of the heat-exchange means.

On the accompanying drawing there is shown apparatus which is to be understood as being of a schematic character merely for the purpose of illustrating suitable equipment for the practice of the present invention, Fig. 1 is a sectional view of a vat or vessel having disposed therein a heat-exchange device which utilizes an electrical resistance for the production of heat;

Fig. 2 is a top plan view of the mechanism depicted in Fig. 1 and being taken substantially on the plane of the line 2—2 in Fig. 1;

Fig. 3 is a top view of the heat-exchange device depicted in Fig. 1;

Fig. 4 is an end view in part of the heat-exchange device depicted in Fig. 1;

Fig. 5 is merely a modification of the heat-exchange device wherein a fluid medium may be used for heat introduction.

The findings of the present invention make it practicable to effect an efficient conversion of starch to sugar by merely introducing into a fermenter a commonly used cereal material such as, malt and cooked corn with the seed yeast and without the prior used step of converting the cereal mash before starting the alcoholic-yeast fermentation.

To fully comprehend this invention it should be understood that the enzymic conversion of starch to sugar is a momentary reaction when a malt and starch mash are favorably united and subjected to the normal conversion temperature of about 145° F.

In the use of transient heat application as above described with a thick cereal mash composed of cooked corn and malt infusion, as is commonly used for alcohol production, it is unnecessary to effect conversion of any appreciable percentage of the carbohydrates to sugar before seeding the mixture with yeast. Other processes are already known wherein the amylaceous conversion is limited before the initiation of alcoholic-yeast fermentation. However, none of them makes possible the use of temperatures far above the normal yeast-fermenting degree for the activation of heat labile enzymes during a process of alcoholic-yeast fermentation and it is this accomplishment of the present invention which is particularly valuable to the art.

It is likely that the reasons for an increased production of alcohol with the application of the present method cannot be entirely nor unmistakably determined, although, while contributing factors are included in the following, it should be understood that the invention is not in any way limited to these explanations and that they are to be regarded in part as hypothetical.

Activation of amylase and other heat labile enzymes at temperatures above the normal yeast-fermenting degree, a more perfect dissemination of yeast cell clusters, softening of the yeast shell effecting an accelerated yeast activity, an improved yeast cell permeability resulting in increased osmosis, greater decomposition of proteinic materials and destruction of yeast-parasitic micro-organisms.

As illustrative of a method for carrying out the invention wherein the conversion of starch to fermentable sugar is advantagously effected with the presence of seed yeast and an amylase containing material, the Indian corn or like starchy material is crushed or ground in a suitable machine, after which it is transferred to a digester. To the grist is then added an amount of water equal to about five times the weight of the corn, the pH is adjusted to approximately 5.5 with any suitable acidic material for an optimum acidity and the resulting mash is then subjected while under constant agitation to the action of superheated steam until the temperature reaches about 350° F. This high temperature treatment is carried out for a period of several minutes which is ordinarily sufficient to place the material in condition for subsequent utilization. The material remaining in the digester at this stage is in the form of a gelatinous mash and such starch substances are quite thoroughly gelatinized for enzymic conversion to alcoholic-yeast fermentable sugar. The starchy material having been broken down and such substances are in condition for amylase fermentation the mash is removed from the digester and cooled to a temperature of about 110° F. and at this temperature it is passed into the fermentation vessel while still in a flowing state. To this corn mash in the fermenter is immediately added and mixed a crushed malt suitable for starch conversion to fermentable sugar and the water content of the malted mash is to equal at least 5 parts water to 1 part cereal by weight. The amount of malt required for efficient conversion is usually a ratio of about 1 part malt for 10–12 parts corn by weight in this particular process. The malted mash is then further cooled to an alcoholic-yeast-fermenting degree by any suitable means such as surrounding the fermenter with cold water or by the use of an interiorly disposed serpentine coil commonly known as an attemperator coil and/or by the addition of cold water if required to make up the loss of water by evaporation during digestion of the corn mash. Aeration may also be used with the introduction of cool air to hasten the final cooling period during which the temperature is being reduced to an alcoholic-yeast-fermenting range. The mash is now seeded with a sufficient quantity of distiller's yeast to cause and permit active alcoholic-yeast fermentation. Favorable results are obtained with the use of the commonly known yeast specie *Saccharomyces cerevisiae*. In processes where this invention is to be advantageously employed it will be found that by revolving or circulating the yeast-seeded-fermentable medium there is attained a more perfect mixture of the component materials and a more favorable distribution of heat thereby effecting an efficient means for the dissipation of an excess substantially-over-all-heat by which there is accomplished the localized or transient heat application for the present invention. These steps of course, form no part of the present invention but merely condition the fermentable medium for the application of the treatment which includes the following described improvement: In practice it has been learned that improved results are achieved by slowly revolving the yeast-seeded-fermentable medium at a rate of 13–25 ft. per minute while contacting, in a little by little manner, a heat-exchange means in the form of a double-edged sword or louver having a width of about 3 inches and a thickness of about ½ inch arranged to extend into the vessel in a manner to be "streamlined" with the horizontally revolving movement of the yeast-seeded-fermentable mash and providing a heated surface of about ½–1 sq. inch per gallon of the yeast-containing-fermentable solution. The heat-exchange means may be made of any heat conducting material which is innocuous to yeast. Favorable results may be had by the use of an electrical resistance heating element packed in tubing with magnesium oxide commonly known as a "Cal" rod which was cast into a high purity zinc with the above stated dimensions. The electrical characteristic of the heater element was approximately 2000 watts per lineal foot extending into the fermentation vessel. Heating units such as described may be purchased under the proprietary name of "Thermaheater" from Thermal Inc., located in Chicago, Illinois.

At the start of the fermentation process, that is after the stock yeast has been added, it is beneficial to revolve the batch while transiently heating portions at a starch conversion temperature as hereinbefore described until conversion of a small percentage of the starch; this treatment being followed by a period of quiet until vigorous alcoholic-yeast fermentation has commenced when sufficient relatively cool water with a temperature of about 60° F. is gradually added to the batch to effect a normal dilution and at the same time a degree of heat is again transiently applied for a period sufficient to effect conversion of a substantial part of the remaining starch. An excess substantially-over-all-accumulative heat is to be dissipated by dilution or by any suitable means such as herein described so as to maintain a substantially-over-all-alcoholic-fermenting temperature of about 70° F.–90° F. during the process.

After fermentation for a period of about 72 hours the process is usually completed, the resulting product may be distilled if distillation is necessary for the utilization of the alcohol. In addition to other obvious advantages of the present invention; with like materials and otherwise identical conditions there is an increase of alcohol produced amounting to about 2%.

As another example of a process utilizing the present invention, wherein instead of cereals there is used an alcoholic-yeast-fermentable medium composed chiefly of sugar material in the form of a blackstrap molasses-containing solution which is made up in the usual manner with about 12% sugar content having a pH of about 5 which results from a sufficient addition of acid and seeded at a temperature of about 70° F. with a suitable yeast of the specie *Saccharomyces cerevisiae* in an amount equal to about 500,000,000 cells per cubic centimeter. If required this medium may be supplemented with nitrogen and/or phosphorus containing compounds. During the first phase of the process cool air is distributed in the batch at a temperature of about 60° F. Heat is now applied to the batch at temperatures above 110° F. according to the present invention and in a manner as described in the preceding example until vigorous fermentation is apparent by an increased fermenter content temperature. The application of localized heat and the aeration is now discontinued and the fermentation maintained for a total period of about 6 hours after which time the product may be distilled if distillation is necessary for the utilization of the alcohol. With like materials and otherwise identical conditions there has been accomplished a gain of about 2% in alcohol production with only the application of heat in a manner as herein described.

A convenient method for ascertaining the degree of temperature exchange of the localized heat application is the employment of a thermocouple with a galvanometer for the millivoltage thermoelectrical measurement and it is suggested to arrange the extremity of the extension leads or compensating leads very close to the trailing edge of the heat-exchange means at the point of the least liquid movement.

It will of course be understood that while the exact mode of treatment defined is practicable the invention is not limited strictly thereto, as departures may be made as circumstances require and since alcoholic-yeast fermentation can be carried out with many different processes and materials without departing from the scope of the invention it is intended that all matter contained in the above description shall be interpreted as illustrative and not in any limiting sense.

As an example, while a heat-exchange means of the above described capacity gives good results its characteristics may be varied within limits to accord with varying conditions and similarly the speed of movement of the fermenting medium can be varied which naturally results in a correspondingly different degree of temperature exchange.

I claim:

1. A process for the production of alcohol by yeast fermentation and wherein the temperature of successive small portions of the yeast-stocked medium are intermittently elevated above 132° F. and then mixed into the remaining larger portion of the yeast-stocked medium most of which is at the same time maintained at a temperature range of about 70° F.–90° F. by therein cooling cumulative heat that is caused, at least in part, by mixing the successive small portions of the medium into the remaining larger portion of the medium, which comprises the following improvement: when including cooked starch and malt in said yeast-stocked medium, diastatically converting the cooked starch and then producing alcohol by the action of said yeast on the resultant sugar.

2. A process for the production of ethyl alcohol by yeast fermentation and wherein the temperature of successive small portions of the yeast-stocked medium are intermittently elevated above 132° F. and then mixed into the remaining larger portion of the yeast-stocked medium most of which is at the same time maintained at a temperature range of about 70° F.–90° F. by therein cooling cumulative heat that is caused, at least in part, by mixing the successive small portions of the medium into the remaining larger portion of the medium, which comprises the following improvement: when including gelatinized starch and a diastatic agent in said yeast-stocked medium, diastatically converting the starch and then producing ethyl alcohol by the action of said yeast on the resultant sugar.

References Cited in the file of this patent

UNITED STATES PATENTS

| | | |
|---|---|---|
| 1,673,735 | Corby | June 12, 1928 |
| 1,808,593 | Clark | June 2, 1931 |
| 2,053,770 | Dreyfus | Sept. 8, 1936 |
| 2,146,326 | Bersius | Feb. 7, 1939 |
| 2,155,134 | Karsch | Apr. 18, 1939 |
| 2,272,982 | Owen | Feb. 10, 1942 |
| 2,705,215 | Griesbach | Mar. 29, 1955 |

OTHER REFERENCES

Pratt et al. *Antibiotics*, Lippincott, page 37.